(12) United States Patent
Yokokawa

(10) Patent No.: US 12,530,108 B2
(45) Date of Patent: Jan. 20, 2026

(54) SYSTEMS AND METHODS FOR PRESENTING A NOTIFICATION WITH AN ELECTRONIC DEVICE

(71) Applicant: Apple Inc., Cupertino, CA (US)

(72) Inventor: Yutaka Yokokawa, Belmont, CA (US)

(73) Assignee: Apple Inc., Cupertino, CA (US)

( * ) Notice: Subject to any disclaimer, the term of this patent is extended or adjusted under 35 U.S.C. 154(b) by 197 days.

(21) Appl. No.: 18/534,472

(22) Filed: Dec. 8, 2023

(65) Prior Publication Data

US 2024/0211102 A1    Jun. 27, 2024

Related U.S. Application Data

(60) Provisional application No. 63/477,333, filed on Dec. 27, 2022.

(51) Int. Cl.
*G06F 3/0482*    (2013.01)
*G06F 3/01*    (2006.01)
*H05B 47/165*    (2020.01)

(52) U.S. Cl.
CPC ............ *G06F 3/0482* (2013.01); *G06F 3/013* (2013.01); *H05B 47/165* (2020.01)

(58) Field of Classification Search
None
See application file for complete search history.

(56) References Cited

U.S. PATENT DOCUMENTS

| | | | |
|---|---|---|---|
| 12,242,580 B1 * | 3/2025 | Philbrick | G06F 21/84 |
| 12,405,717 B2 * | 9/2025 | Carrigan | G06F 3/0482 |
| 2022/0391073 A1 * | 12/2022 | Cranfill | G06F 3/04842 |
| 2023/0359315 A1 * | 11/2023 | Karunamuni | H04M 1/72469 |
| 2024/0248532 A1 * | 7/2024 | Salter | G06F 3/017 |
| 2024/0310907 A1 * | 9/2024 | Chiu | G06F 3/04842 |
| 2025/0208814 A1 * | 6/2025 | Williams | G06F 3/012 |
| 2025/0264991 A1 * | 8/2025 | Liu | G06F 3/013 |

OTHER PUBLICATIONS

Apple, "Manage Notifications From Messages on Mac", Messages User Guide, Available online at: <https://support.apple.com/en-za/guide/messages/icht3a134ea1/14.0/mac/14.0>, [retrieved on Mar. 8, 2024], 2 pages.
Apple, "Manage Notifications From Reminders on Mac", Reminders User Guide, Available online at: <https://support.apple.com/en-za/guide/reminders/remn4e53b572/mac>, [retrieved on Mar. 8, 2024], 2 pages.

* cited by examiner

*Primary Examiner* — Wilson Lee
(74) *Attorney, Agent, or Firm* — Kubota & Basol LLP

(57) ABSTRACT

An indication of a notification can be provided via a plurality of lighting devices of a device. In some examples, the device presents a first indication of a notification via one or more first lighting devices of the plurality of lighting devices. In accordance with a determination that a first input satisfies one or more first criteria indicative of attention toward the one or more first lighting devices, the device presents a second, different indication of the notification via one or more second lighting device of the plurality of lighting devices. In some examples, in accordance with a determination that a second input satisfies one or more second criteria indicative of attention toward the one or more second lighting devices, the device presents, via the one or more displays, a user interface element corresponding to the notification.

24 Claims, 11 Drawing Sheets

SYSTEMS AND METHODS FOR PRESENTING A NOTIFICATION WITH AN ELECTRONIC DEVICE

CROSS-REFERENCE TO RELATED APPLICATIONS

This application claims benefit of U.S. Provisional Application No. 63/477,333, filed Dec. 27, 2022, the entire disclosure of which is herein incorporated by reference for all purposes.

FIELD OF THE DISCLOSURE

This relates generally to systems and methods for presenting a notification with an electronic device.

BACKGROUND OF THE DISCLOSURE

Notifications are often presented to a user of an electronic device. However, disruptions from notifications can degrade user experience.

SUMMARY OF THE DISCLOSURE

Some examples of the disclosure are related generally to systems and methods for presenting a notification with an electronic device for an improved user experience. In some examples, the method for presenting the notification may enable the user to be aware of the notification and to access the notification when desired with minimal disruption to the user of the electronic device. In some examples, the user may be informed of a notification through an indication of the notification. In some examples, the indication of the notification may be presented using one or more lighting devices of the electronic device. In some examples, the indication of the notification may be presented via a display of the electronic device in an extended reality environment.

In some examples, at an electronic device in communication with a plurality of lighting devices, one or more input devices and one or more displays, the electronic device presents, via one or more first lighting devices of the plurality of lighting devices, a first indication of a notification. In some examples, the electronic device detects, via the one or more input devices, a first input indicative of attention toward the one or more first lighting devices. In some examples, in accordance with a determination that the first input satisfies one or more first criteria, the electronic device presents, via one or more second lighting devices of the plurality of lighting devices, a second indication of the notification different from the first indication of the notification. In some examples, the electronic device detects, via the one or more input devices, a second input indicative of attention toward the one or more second lighting devices. In some examples, in accordance with a determination that the second input satisfies one or more second criteria, the electronic device presents, via the one or more displays, a user interface element corresponding to the notification. In some examples, the one or more first criteria include a criterion that is satisfied when a user gazes in a direction of the plurality of lighting devices for a first threshold period of time. In some examples, the one or more second criteria include a criterion that is satisfied when a user gazes in a direction of the plurality of lighting devices for a second threshold period of time. In some examples, the electronic device detects, via the one or more input devices, a third input indicative of attention toward the user interface element corresponding to the notification. In some examples, in accordance with a determination that the third input satisfies one or more third criteria, the electronic device presents, via the one or more displays, a second user interface element corresponding to the notification that is different from the first user interface element.

In some examples, at an electronic device in communication with one or more input devices and one or more displays, the electronic device presents, via the one or more displays, a first indication of a notification. In some examples, the electronic device detects, via the one or more input devices, a first input indicative of attention toward the first indication. In some examples, in accordance with a determination that the first input satisfies one or more first criteria, the electronic device presents, via the one or more displays, a second indication of the notification different from the first indication of the notification. In some examples, the electronic device detects, via the one or more input devices, a second input indicative of attention toward the second indication. In some examples, in accordance with a determination that the second input satisfies one or more second criteria, the electronic device presents, via the one or more displays, a user interface element corresponding to the notification. In some examples, the one or more first criteria include a criterion that is satisfied when a user gazes in a direction of the first indication for a first threshold period of time. In some examples, the one or more second criteria include a criterion that is satisfied when a user gazes in a direction of the second indication for a second threshold period of time. In some examples, the electronic device detects, via the one or more input devices, a third input indicative of attention toward the user interface element corresponding to the notification. In some examples, in accordance with a determination that the third input satisfies one or more third criteria, the electronic device presents, via the one or more displays, a second user interface element corresponding to the notification that is different from the first user interface element.

DETAILED DESCRIPTION

Figure 1:
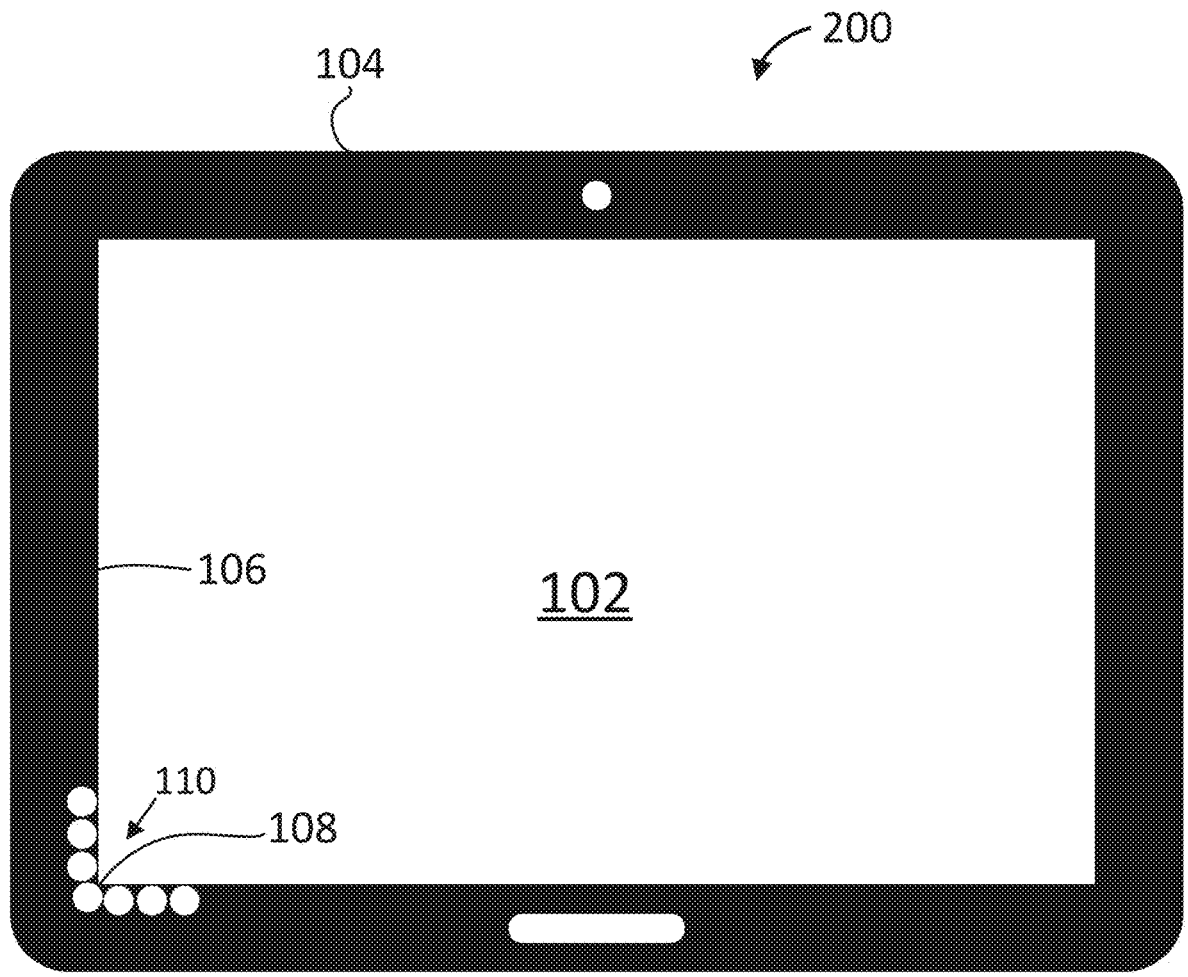
FIG. 1 illustrates an example of an electronic device comprising a display and one or more lighting devices, according to some examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some examples of the disclosure are related generally to systems and methods for presenting a notification with an electronic device for an improved user experience. In some examples, the method for presenting the notification may enable the user to be aware of the notification and to access the notification when desired with minimal disruption to the user of the electronic device. In some examples, the user may be informed of a notification through an indication of the notification. In some examples, the indication of the notification may be presented using one or more lighting devices of the electronic device. In some examples, the indication of the notification may be presented via a display of the electronic device in an extended reality environment.

In some examples, at an electronic device in communication with a plurality of lighting devices, one or more input devices and one or more displays, the electronic device presents, via one or more first lighting devices of the plurality of lighting devices, a first indication of a notification. In some examples, the electronic device detects, via the one or more input devices, a first input indicative of attention toward the one or more first lighting devices. In some examples, in accordance with a determination that the first input satisfies one or more first criteria, the electronic device presents, via one or more second lighting devices of the plurality of lighting devices, a second indication of the notification different from the first indication of the notification. In some examples, the electronic device detects, via the one or more input devices, a second input indicative of attention toward the one or more second lighting devices. In some examples, in accordance with a determination that the second input satisfies one or more second criteria, the electronic device presents, via the one or more displays, a user interface element corresponding to the notification. In some examples, the one or more first criteria include a criterion that is satisfied when a user gazes in a direction of the plurality of lighting devices for a first threshold period of time. In some examples, the one or more second criteria include a criterion that is satisfied when a user gazes in a direction of the plurality of lighting devices for a second threshold period of time. In some examples, the electronic device detects, via the one or more input devices, a third input indicative of attention toward the user interface element corresponding to the notification. In some examples, in accordance with a determination that the third input satisfies one or more third criteria, the electronic device presents, via the one or more displays, a second user interface element corresponding to the notification that is different from the first user interface element.

In some examples, at an electronic device in communication with one or more input devices and one or more displays, the electronic device presents, via the one or more displays, a first indication of a notification. In some examples, the electronic device detects, via the one or more input devices, a first input indicative of attention toward the first indication. In some examples, in accordance with a determination that the first input satisfies one or more first criteria, the electronic device presents, via the one or more displays, a second indication of the notification different from the first indication of the notification. In some examples, the electronic device detects, via the one or more input devices, a second input indicative of attention toward the second indication. In some examples, in accordance with a determination that the second input satisfies one or more second criteria, the electronic device presents, via the one or more displays, a user interface element corresponding to the notification. In some examples, the one or more first criteria include a criterion that is satisfied when a user gazes in a direction of the first indication for a first threshold period of time. In some examples, the one or more second criteria include a criterion that is satisfied when a user gazes in a direction of the second indication for a second threshold period of time. In some examples, the electronic device detects, via the one or more input devices, a third input indicative of attention toward the user interface element corresponding to the notification. In some examples, in accordance with a determination that the third input satisfies one or more third criteria, the electronic device presents, via the one or more displays, a second user interface element corresponding to the notification that is different from the first user interface element.

FIG. 1 illustrates an example of an electronic device comprising a display and one or more lighting devices, according to some examples of the disclosure. In some examples, the electronic device 200 (also referred to as device 200) may be a variety of electronic systems that enable a user to interact with an extended reality (XR) environment, such as a mobile device, tablet, desktop/laptop computer, head-up display, head-mounted display and/or displays formed as lenses to be placed on a person's eyes.

In some examples, the device 200 includes a frame 104 that surrounds a display 102. In some examples, the frame 104 may include an inner perimeter 106 directly adjacent to the display 102. In some examples, one or more lighting devices 110 may be mounted and/or housed in the frame 104. The one or more lighting devices 110, which are schematically depicted as white circles arranged in the frame 104 in FIG. 1, may be secured to the frame 104 utilizing various mounting methods. For example, the one or more lighting devices 110 may be received by one or more apertures in the frame 104. In other examples, the one or more lighting devices 110 may be housed in a common housing, and the housing may be secured on a surface of the frame 104 (e.g., perimeter 106), such as through mounting devices and/or adhesion. In some examples, a housing for the one or more lighting devices and the frame 104 may be a single manufactured component. In some examples, the one or more lighting devices 110 may include various lighting sources, such as light-emitting diodes (LEDs), configured to project light toward the display 102 such that it is visible by a user of the device 200. In some examples, the one or more lighting devices 110 may emit light having a brightness or intensity that does not obstruct or interfere with the view of the physical environment and/or presentations in an XR environment presented via the display 102 to the user. The one or more lighting devices 110 may project light of various colors, brightness and/or in various patterns. In some examples, the one or more lighting devices 110 may be arranged adjacent to the perimeter 106 of the display 102. For example, the one or more lighting devices 110 may be arranged adjacent to the lower corner 108 of the perimeter of the display 102, such that light may project toward the lower corner of the display 102. In some examples, the one or more lighting devices 110 may be a single lighting device. In some examples, the one or more lighting devices 110 may be a plurality of lighting devices, and one or more lighting devices may be selectively used out of the plurality of lighting devices to present different types of indications (e.g., different lighting patterns, brightness, colors etc.). In some examples, one or more first lighting devices may be used to present a first indication, and one or more second lighting devices may be used to present a second indication. In some examples, the one or more first lighting devices are a first subset of a plurality of lighting devices, and the one or more second lighting devices are a second subset of the plurality of lighting devices, different from the one or more second lighting devices. In some examples, one or more of the plurality of lighting devices are optionally included in the first subset and the second subset. For example, a first lighting device is optionally used (e.g., illuminated) as part of the presentation of the first indication, and the first lighting device is optionally also used as part of the presentation of the second indication.

Although FIG. 1 illustrates a single display and one or more lighting device 110 at one corner of the display, in some embodiments, the device 200 may include multiple displays. For example, in some embodiments, the device 200 includes a first display and a second display configured for each of a user's eyes as components of a head-mounted display. Each of the displays can include respective features of display 102 including the one or more lighting devices 110. For example, the first display optionally includes respective one or more lighting devices and the second display optionally includes respective one or more lighting devices. In some embodiments, the one or more lighting devices 110 for each of the displays are displayed at the same corner of frame 104 (e.g., the lower left corner for each display) to enable the user to gaze with both eyes in the same general direction. In some examples, the first display includes one or more lighting devices and the second display does not include one or more lighting devices (e.g., the one or more lighting devices are housed and/or mounted in a portion of a frame that surrounds the first display (e.g., adjacent to a perimeter and/or a corner of the first display)).

Figure 2:
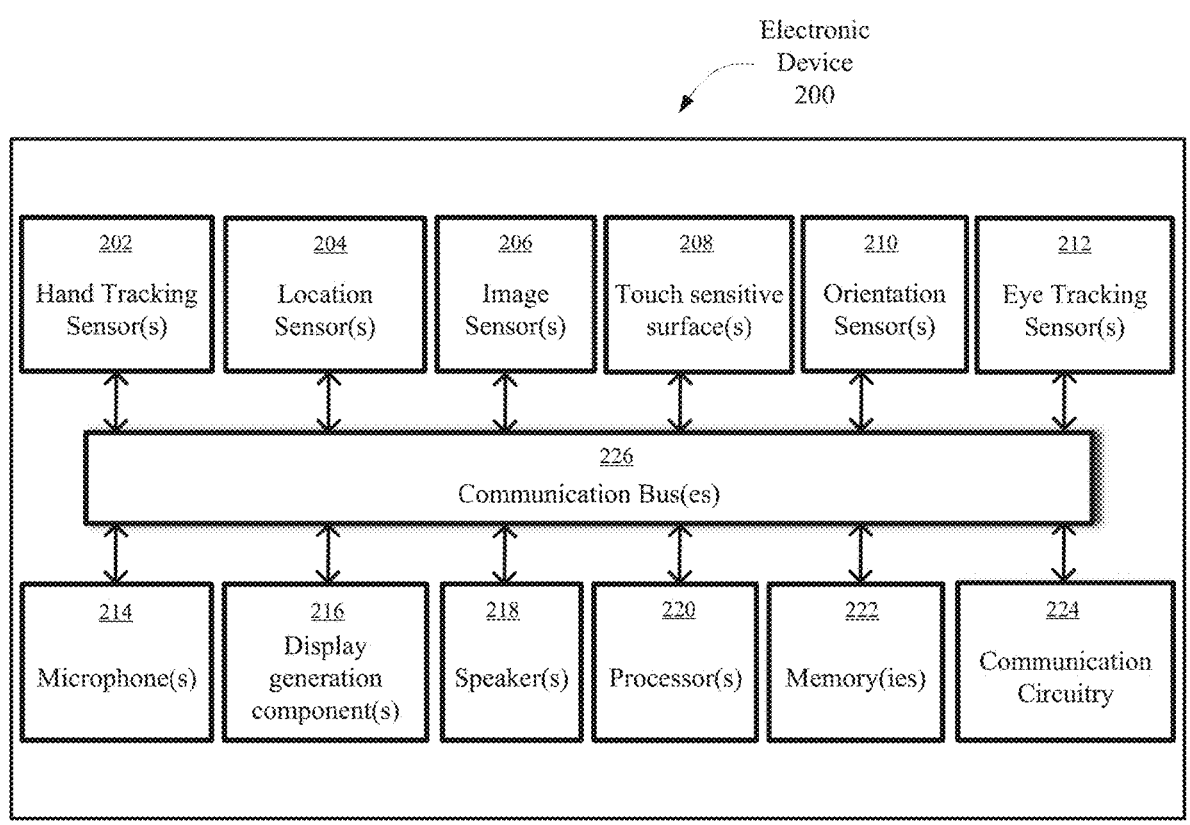
FIG. 2 illustrates a block diagram of an example architecture of the electronic device according to some examples of the disclosure.

FIG. 2 illustrates a block diagram of an example architecture of the electronic device (also referred to as device 200) according to examples of the disclosure. In some examples, as illustrated in FIG. 2, device 200 includes various sensors, (e.g., one or more hand tracking sensor(s) 202, one or more location sensor(s) 204, one or more image sensor(s) 206, one or more touch sensitive surface(s) 208, one or more orientation sensor(s) 210, one or more eye tracking sensor(s) 212, and one or more microphone(s) 214 or other audio sensors, etc.), one or more display generation component(s) 216, one or more speaker(s) 218, one or more processor(s) 220, one or more memories 222, and/or communication circuitry 224. In some examples, communication bus(es) 226 may be used for communication between the above-mentioned components of the device 200.

In some examples, communication circuitry 224 includes circuitry for communicating with electronic devices, networks, such as the Internet, intranets, a wired network and/or a wireless network, cellular networks, and wireless local area networks (LANs). In some examples, communication circuitry 224 includes circuitry for communicating using near-field communication (NFC) and/or short-range communication, such as Bluetooth®.

Processor(s) 220 include one or more general processors, one or more graphics processors, and/or one or more digital signal processors. In some examples, memory 222 is a non-transitory computer readable storage medium (e.g., flash memory, random access memory, or other volatile or non-volatile memory or storage) that stores computer-readable instructions configured to be executed by processor(s) 220 to perform the techniques, processes, and/or methods described below. In some examples, memory 222 can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

In some examples, display generation component(s) 216 include a single display (e.g., a liquid-crystal display (LCD), organic light-emitting diode (OLED), or other types of display). In some examples, display generation component(s) 216 includes multiple displays. In some examples, display generation component(s) 216 can include a display with touch capability (e.g., a touch screen), a projector, a holographic projector, a retinal projector, etc. In some examples, electronic device 200 includes touch-sensitive surface(s) 208 for receiving user inputs, such as tap inputs and swipe inputs or other gestures. In some examples, display generation component(s) 216 and touch sensitive surface(s) 208 form touch-sensitive display(s) (e.g., a touch screen integrated with device 200 or external to device 200 that is in communication with device 200).

In some examples, device 200 includes image sensor(s) 206. Image sensors(s) 206 optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206 also optionally include one or more depth sensors configured to detect the distance of physical objects from device 200. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, device 200 uses CCD sensors, event cameras, and depth sensors in combination to detect the physical environment around device 200. In some examples, image sensor(s) 206 include a first image sensor and a second image sensor. The first image sensor and the second image sensor work in tandem and are optionally configured to capture different information of physical objects in the real-world environment. In some examples, the first image sensor is a visible light image sensor, and the second image sensor is a depth sensor. In some examples, device 200 uses image sensor(s) 206 to detect the position and orientation of device 200 and/or display generation component(s) 216 in the real-world environment. For example, device 200 uses image sensor(s) 206 to track the position and orientation of display generation component(s) 216 relative to one or more fixed objects in the real-world environment.

In some examples, device 200 includes microphone(s) 214 or other audio sensors. Device 200 uses microphone(s) 214 to detect sound from the user and/or the real-world environment of the user. In some examples, microphone(s) 214 includes an array of microphones (a plurality of microphones) that optionally operate in tandem, such as to identify ambient noise or to locate the source of sound in space of the real-world environment.

Device 200 includes location sensor(s) 204 for detecting a location of device 200 and/or display generation component(s) 216. For example, location sensor(s) 204 can include a GPS receiver that receives data from one or more satellites and allows device 200 to determine the device's absolute position in the physical world.

Device 200 includes orientation sensor(s) 210 for detecting orientation and/or movement of device 200 and/or display generation component(s) 216. For example, device 200 uses orientation sensor(s) 210 to track changes in the position and/or orientation of device 200 and/or display generation component(s) 216, such as with respect to physical objects in the real-world environment. Orientation sensor(s) 210 optionally include one or more gyroscopes and/or one or more accelerometers.

Device 200 includes hand tracking sensor(s) 202 and/or eye tracking sensor(s) 212, in some examples. Hand tracking sensor(s) 202 are configured to track the position/location of one or more portions of the user's hands, and/or motions of one or more portions of the user's hands with respect to the extended reality environment, relative to the display generation component(s) 216, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 216. In some examples, hand tracking sensor(s) 202 and/or eye tracking sensor(s) 212 are implemented together with the display generation component(s) 216. In some examples, the hand tracking sensor(s) 202 and/or eye tracking sensor(s) 212 are implemented separate from the display generation component(s) 216.

In some examples, the hand tracking sensor(s) 202 can use image sensor(s) 206 (e.g., one or more IR cameras, 3D cameras, depth cameras, etc.) that capture three-dimensional information from the real-world including one or more hands (e.g., of a human user). In some examples, the hands can be resolved with sufficient resolution to distinguish fingers and their respective positions. In some examples, one or more image sensor(s) 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by a respective eye tracking camera/illumination source(s).

Device 200 are not limited to the components and configuration of FIG. 2, but can include fewer, other, or additional components in multiple configurations. In some examples, device 200 can be implemented in a single device. A person or persons using device 200, is optionally referred to herein as a user or users of the device(s).

Figure 3:
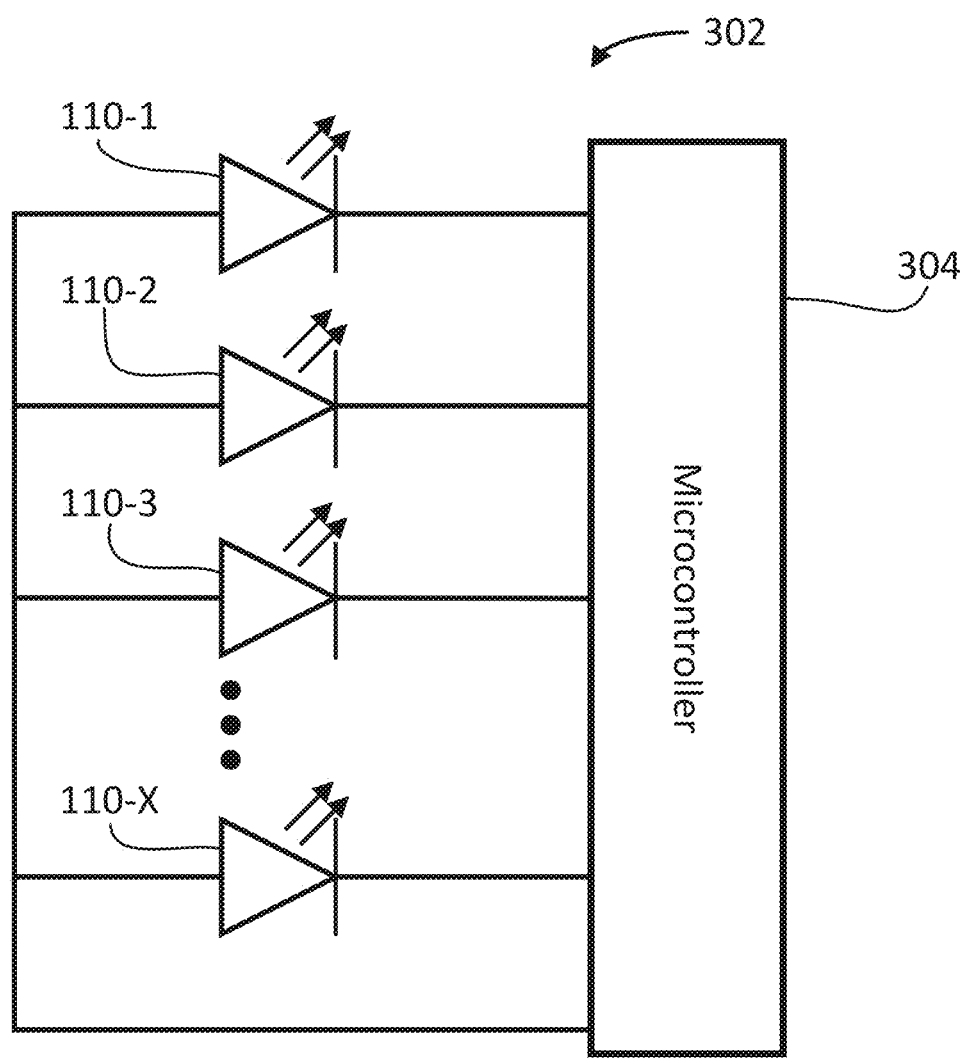
FIG. 3 illustrates a schematic representation of an example circuit for one or more lighting devices of the electronic device, according to some examples of the disclosure.

FIG. 3 illustrates a schematic representation of an example circuit for one or more lighting devices of the electronic device, according to some examples of the disclosure. In particular, the example circuit 302 facilitates the connection of the one or more lighting devices 110 (shown in FIG. 3 as example lighting devices 110-1, 110-2, 110-3, and 110-X) to a microcontroller 304 of the device 200. In some examples, the microcontroller 304 may provide an output signal to lighting devices 110-1, 110-2, 110-3 and 110-X. The output signal may control an indication presented by the one or more lighting devices 110-1, 110-2, 110-3 and 110-X. For example, the indication may include the state of illumination, brightness, color, and/or pattern (e.g., a sequence of illumination, flashing, and/or changing of color and/or brightness) of the one or more lighting devices 110-1, 110-2, 110-3 and 110-X. In some examples, the microcontroller 304 may be in communication with one or more components of the device 200 presented in FIG. 2. In some examples, the microcontroller 304 is in communication with and/or is a component of processor(s) 220. In some examples, the microcontroller 304 includes switching circuitry (e.g., closing specific circuits to cause illumination of one or more lighting devices). For example, the switching circuitry is utilized when the processor(s) 220 executes one or more methods involving the illumination of the one or more lighting devices 110-1, 110-2, 110-3, and 110-X.

In some examples, the device 200 may be in communication with another device (e.g., a peripheral or external device), such as a mobile phone or laptop computer, that has connection with a network (e.g., Internet, intranet, cellular network, wired and/or wireless network). In some examples, the device 200 may be in direct communication with a network. In some examples, the device 200 may receive a notification triggering event that may prompt a notification to a user of the device 200. For example, a notification triggering event may include a received message (e.g., e-mail or text message), phone call and/or a web or mobile application push notification. Based on a notification triggering event, the device 200 may provide an indication of a notification to a user. In some examples, the indication may be presented via the one or more lighting devices 110. In alternative examples, the indication may be presented via the display 102.

Figure 4:
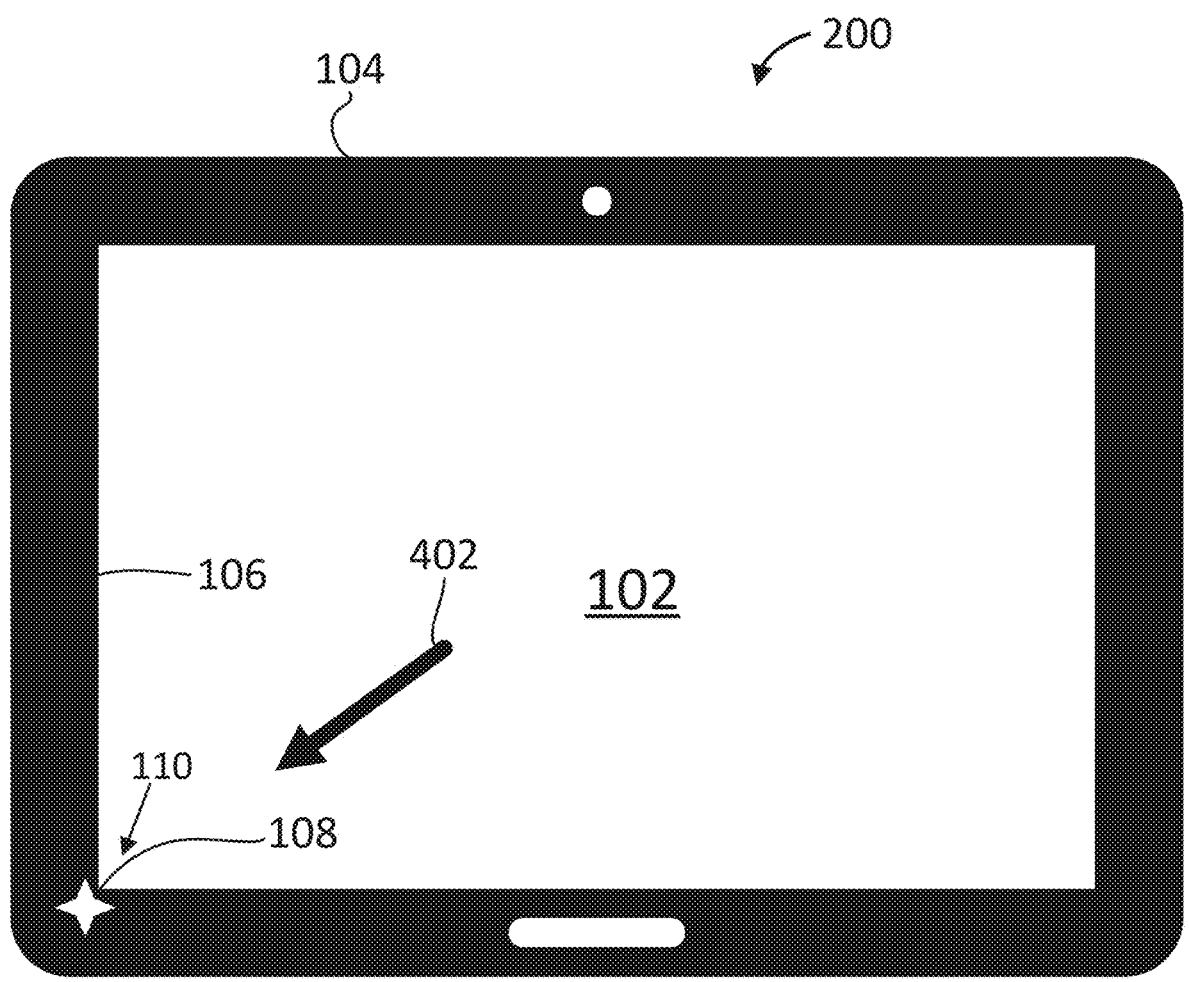
FIG. 4 illustrates the electronic device presenting an indication of a notification using one or more lighting devices, according to some examples of the disclosure.

FIG. 4 illustrates the device 200 presenting an indication of a notification using one or more lighting devices, according to some examples of the disclosure. In some examples, the one or more lighting devices 110 (schematically depicted in an illuminated state as a white star arranged in the frame 104 in FIG. 4) may present a first indication of a notification. In some examples, the first indication may be presented in response to receiving a notification triggering event. As shown in FIG. 4, the first indication may include one or more lighting devices 110 in an illuminated state. In some examples, the first indication may be presented using a particular characteristic. For example, a characteristic may include different patterns (e.g., sequencing of illumination, flashing, and/or illumination of one or more subsets of lighting devices of a plurality of lighting devices), brightness and/or colors. In some examples, the characteristic of the first indication may depend on the type of notification the indication corresponds to. For example, the characteristic of the first indication may differ between receiving a phone call and receiving a text message.

In some examples, the first indication may be modified in response to receiving, by one or more input devices of the device 200, one or more inputs. In some examples, a first indication may progress to a second indication in response to receiving one or more first inputs. In some examples, a second indication may replace the first indication in response to receiving one or more first inputs. For example, an input may be a detection of a gaze of a user of the device 200. FIG. 4 illustrates an arrow representative of the gaze 402 of the user. For example, the gaze 402 may be directed toward the one or more lighting devices 110 arranged adjacent to the lower corner 108 of the display 102. Alternatively, the gaze 402 may be directed toward a direction that is within a threshold angle (e.g., 1 degree, 5 degrees, 15 degrees, etc.) and/or toward a location within a threshold distance (e.g., 0.01, 0.1, 0.5, 1, 2 or 5 cm) of the lower corner 108 of the display 102. In some examples, the gaze 402 may be detected using the one or more eye tracking sensors 212. In other examples, alternative inputs may be received that indicate that the user is directing attention toward the one or more lighting devices, such as a verbal input by the user received by the one or more input devices.

In some examples, one or more first criteria may be utilized by the device 200 to determine whether to update the indication of the one or more lighting devices 110 from the first indication to a second indication. Satisfaction of the one or more first criteria may correspond to input indicative of user interest in engaging with a notification. For example, the one or more first criteria may include a criterion that is satisfied when a gaze is directed in the direction of the one or more lighting devices 110 for a first threshold period of time (or directed within a threshold angle of the one or more lighting devices 110 or lower corner 108). In some examples, the one or more first criteria may be stored in a memory of the device 200. In some examples, in accordance with a determination that a first input satisfies the one or more first criteria, the second indication is presented. In some examples, if the one or more first criteria are not satisfied, the one or more lighting devices 110 continue to present the first indication. In some examples, if the one or more first criteria are not satisfied within a threshold period of time (e.g., 1-10 seconds), the first indication is removed at the conclusion of the threshold period of time (e.g., the one or more lighting devices 110 are turned off and no longer illuminated).

Figure 5A:
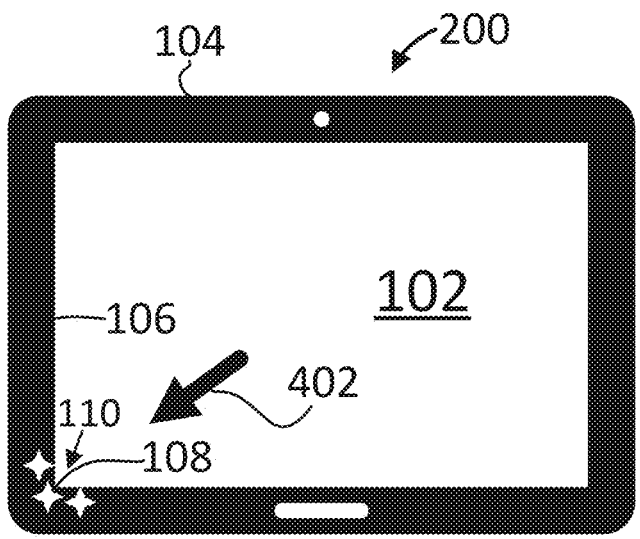
FIGS. 5A-5C illustrate the electronic device presenting a second indication using the one or more lighting devices, according to some examples of the disclosure.
Figure 5B:
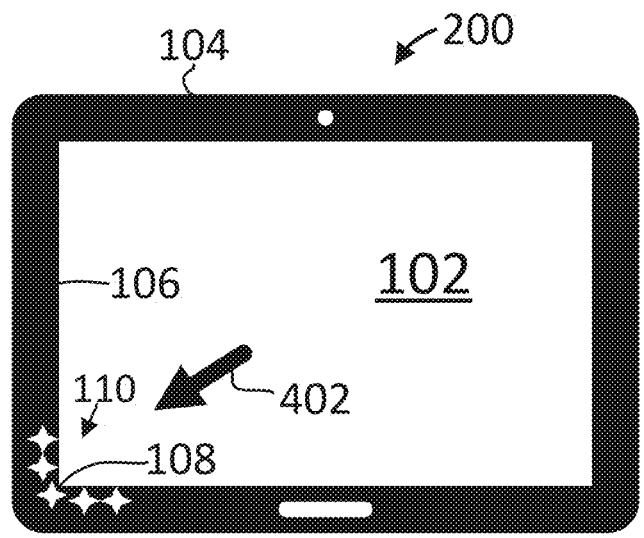
Figure 5C:
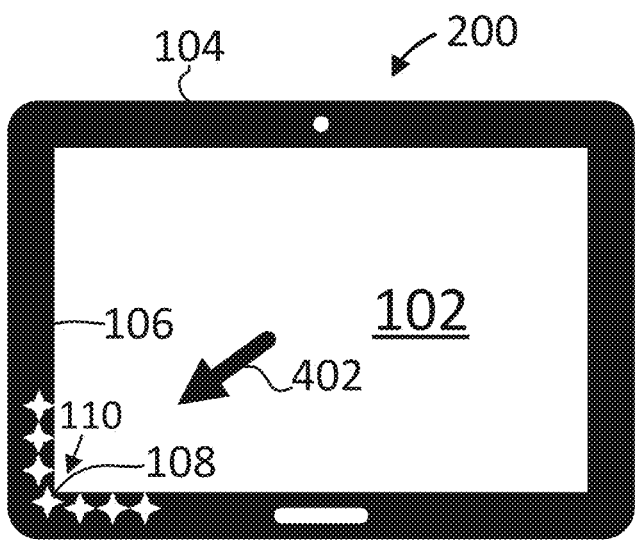

FIGS. 5A-5C illustrate the device 200 presenting a second indication using the one or more lighting devices, according to some examples of the disclosure. In some examples, the second indication may be presented after a determination that a received input has satisfied one or more first criteria utilized by the device to determine whether to update the one or more lighting devices 110 from the first indication to the second indication. Satisfaction of the one or more first criteria may correspond to input indicative of user interest in engaging with a notification. In some examples, the second indication may be presented using a greater quantity of lighting devices than are used to present the first indication. In some examples, the second indication may expand the characteristic of the first indication. For example, one or more first lighting devices may be illuminated during the first indication, and one or more second lighting devices may be illuminated during the second indication. In some examples, the one or more second lighting devices that are illuminated during the second indication include the one or more first lighting devices. Further, the one or more lighting devices may be illuminated such the one or more second lighting devices (optionally including the one or more first lighting devices) that are illuminated may be directly adjacent to each other (e.g., presenting a consistent span of illuminated lighting devices without an intervening non-illuminated lighting device).

In some examples, the second indication may include a characteristic that is different from the characteristic of the first indication. For example, the second indication may be presented in a different pattern from the first indication. For example, the first indication may include a first flashing pattern, and the second indication may not include a flashing pattern (e.g., a pattern without flashing), or the second indication may include a different flashing pattern (e.g., a second flashing pattern at a different frequency from the first flashing pattern). In some examples, the first indication may be presented with one or more first colors, and the second indication may be presented with one or more second colors that are different from the first color(s). In some examples, the first indication may be presented with a first brightness, and the second indication may be presented with a second brightness that is different from the first brightness. It should be understood that the first indication and the second indication may include various characteristics that differentiate the presentation of the first indication from the second indication.

In some examples, the device 200 may receive one or more second inputs. For example, the gaze 402 of the user toward the one or more lighting devices 110 may be a second input. In some examples, the second input is a continuation of the first input. For example, the first input is the gaze 402 of the user toward the one or more lighting devices 110, and the second input is the continuation of the gaze 402 toward the one or more lighting devices 110. In some examples, the one or more first criteria (or similar modified criteria) may be utilized by the device 200 to determine whether to modify the second indication based on the one or more second inputs. Continued satisfaction of the one or more first criteria (or satisfaction of the similar modified criteria) may correspond to input indicative of continued user interest in engaging with a notification. FIG. 5A illustrates a first configuration of the second indication in which one or more second lighting devices are illuminated. FIG. 5B illustrates a second configuration of the second indication in which a greater quantity of second lighting devices is illuminated compared to the first configuration. FIG. 5C illustrates a third configuration of the second indication in which a greater quantity of second lighting devices is illuminated compared to the second configuration. It should be understood that further configurations of the second indication may be used. Modifying the second indication based on continued satisfaction of the one or more first criteria (or satisfaction of the similar modified criteria) provides feedback to the user that the user is completing the criteria needed to expand the notification, thereby confirming that the intent of the user is to expand the notification and improving user device interaction.

In some examples, in response to detecting the gaze 402, one or more second lighting devices may be illuminated based on the duration of the gaze 402 by the user toward the one or more lighting devices 110. For example, after a first duration (e.g., 100 ms, 500 ms, 1 second, etc.) of dwell of the gaze, the second indication may transition from the first configuration to the second configuration, and after a second duration (e.g., 200 ms, 1 second, 2 seconds) of dwell of the gaze, the second indication may transition from the second configuration to the third configuration. It should be understood that any period of time threshold may be established in which the configuration of the second indication is modified in response to one or more received inputs. In some examples, the transition from the first indication to the second indication is gradual and continuous, such that there is a contiguous, gradually growing span of illumination of the one or more first lighting devices without an intervening non-illuminated lighting device as the one or more second lighting devices are illuminated. In some examples, the transition of the second indication between configurations is gradual and continuous such that there is contiguous, gradually growing span of illumination of the one or more first lighting devices without an intervening non-illuminated lighting device as the one or more second lighting devices are illuminated. For example, a contiguous span of illuminated lighting devices gradually expands as the user dwells toward the one or more second lighting devices 110 and additional second lighting devices become illuminated. In some examples, the second indication may transition between configurations throughout the duration of the gaze 402 until one or more second criteria are satisfied.

In some examples, the device 200 may utilize one or more second criteria to determine whether to present a user interface object corresponding to the notification. Satisfaction of the one or more second criteria may correspond to input indicative of user interest in further engaging with the notification. In some examples, the user interface object may be displayed following the display of the second indication (e.g., the second indication and the first indication ceases to be displayed). In other examples, the user interface object may be displayed at least partially or entirely concurrently with the second indication. The one or more second criteria may include a criterion that is satisfied when the gaze 402 is directed in the direction of the one or more lighting devices 110 for a second threshold period of time. Alternatively, one or more second criteria may include a criterion that is satisfied when the gaze 402 may be directed toward a direction that is within a threshold angle of the one or more lighting devices 110 (e.g., within a threshold angle of lower corner 108). In some examples, the one or more second criteria may be stored in the memory of the device 200. In some examples, based on a determination that one or more second inputs (e.g., continued gaze 402 toward the direction of the one or more lighting devices 110) satisfy the one or more second criteria, a user interface element corresponding to a notification may be presented via the display. In some examples, if the one or more second criteria are not satisfied within a threshold period of time (e.g., 1-10 seconds), the second indication (and/or the first indication) is removed (e.g., the one or more lighting devices 110 cease to be illuminated).

In some examples, the transition between configurations of the second indication may be modified based on the one or more second inputs. For example, in a similar manner as the second indication transitions gradually between configurations as in accordance with continued gaze in the prescribed direction (e.g., increasing the contiguous span of illuminated lighting devices), the second indication optionally transitions gradually between configurations in the opposite direction (e.g., decreasing the contiguous span of illuminated lighting devices) in accordance with gaze departing from the prescribed direction. For example, if the second indication is presented as the second configuration, and the user's gaze is no longer directed toward the one or more lighting devices 110 for a threshold period of time (e.g., 25 ms, 50 ms, etc.), the second indication may transition to the first configuration. After a period of time subsequent to the threshold period of time (e.g., 25 ms, 50 ms, etc. after the threshold period of time) that the user's gaze is not directed toward the one or more lighting devices 110, the second indication may transition to the first indication. After an additional period of time subsequent to the threshold period of time (e.g., 50 ms, 75 ms, etc.) that the user's gaze is not directed toward the one or more lighting devices 110, the first indication may be removed. In some examples, redirecting the gaze in the prescribed direction can again resume gradually expanding transitions. For example, when the second indication is presented as the second configuration and the user diverts gaze from the one or more lighting devices 110, the second indication transitions from the second configuration to the first configuration. However, if the user redirects gaze toward the one or more lighting devices 110 within a threshold period of time (e.g., 25 ms, 50 ms, etc.), the second indication may transition to the second configuration, and then to the third configuration, to eventually the maximum configuration corresponding to satisfaction of the one or more second criteria.

Figure 6:
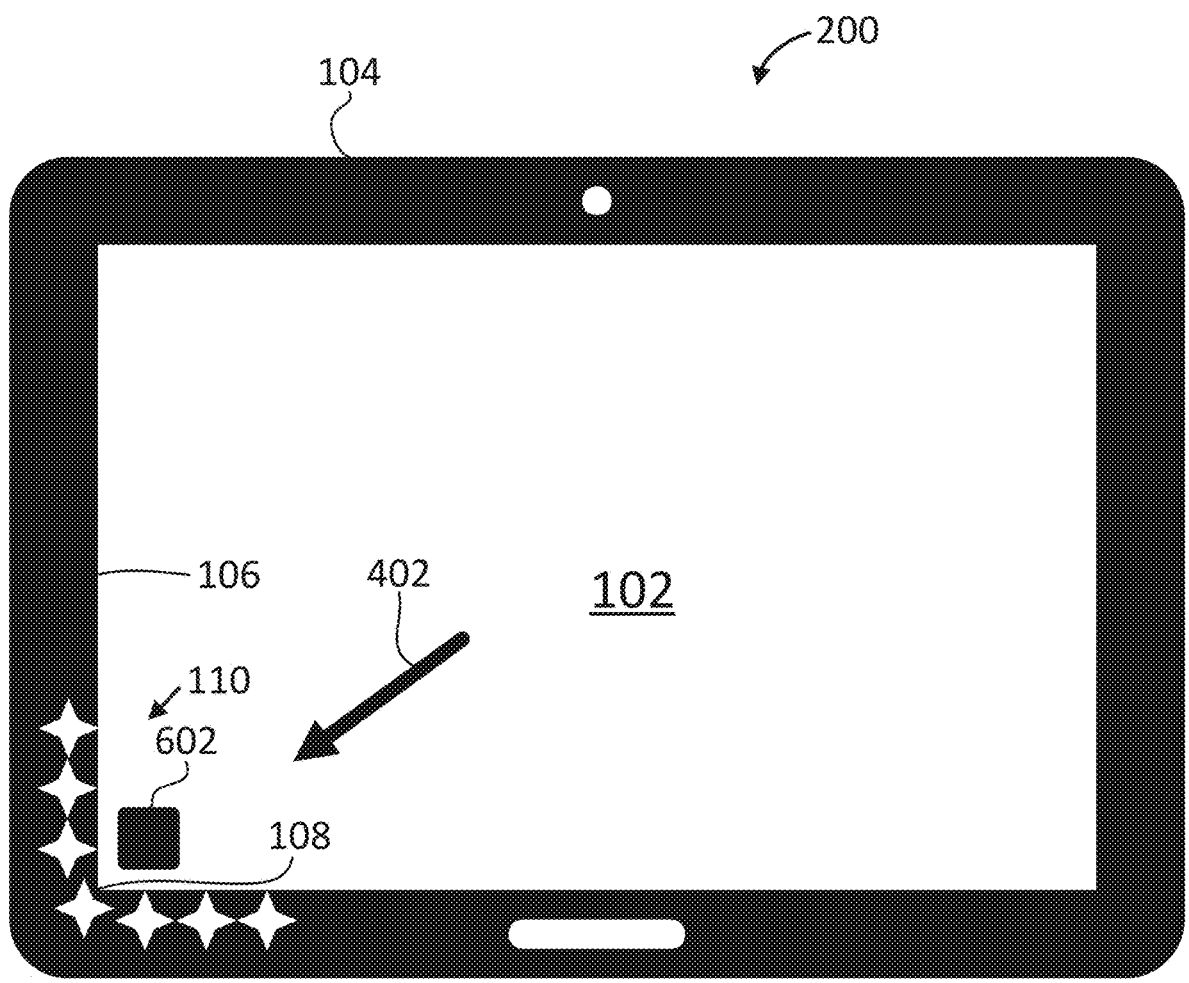
FIG. 6 illustrates the electronic device presenting a first user interface element corresponding to a notification, according to some examples of the disclosure.

FIG. 6 illustrates the device 200 presenting a first user interface element corresponding to a notification, according to some examples of the disclosure. In some examples, a first user interface element 602 may be presented via the display 102. For example, the first user interface element 602 may be presented in an XR environment (e.g., the user interface element 602 is presented virtually overlaid on a physical environment). In some examples, the first user interface element 602 may be presented after the second criteria are satisfied. In some examples, the first user interface element 602 may be presented in various regions of the display 102. For example, the first user interface element 602 may be presented at or within a threshold distance (e.g., 0.01, 0.1, 0.5, 1, 2 or 5 cm) from the perimeter of the display 102 and/or from the one or more lighting devices 110. Additionally, when the first user interface element 602 is presented in a location in a three-dimensional environment, the first user interface element 602 is optionally presented at a location in the three-dimensional environment that is within a threshold angle (e.g., 1 degree, 5 degrees, 15 degrees, 30 degrees, etc.) from the lower corner 108. In some examples, the first user interface element 602 may be displayed in a heads-up display (HUD) user interface of the device 200. In some examples, the user interface element 602 may be displayed on an edge interface of the device 200 (e.g., the frame 104 includes an edge interface where indications and/or user interface elements may be displayed). Further, the user interface element 602 may be presented near the lower corner 108. In other examples the user interface element 602 may be presented within the threshold distance of the perimeter in other areas of the display, such as an upper corner or the left or right side of the display. In some examples, the user interface element 602 may be an icon corresponding to a type of notification (e.g., text message, phone call, or application notification). In some examples, the user interface element 602 may include identifying information corresponding to the notification, such as a photograph of a sender of a text message, the name of a contact, a phone number and/or a caller identification. In some examples, the user interface element 602 includes additional information (e.g., a partial representation of the message), but with less information or detail than the second user interface element described below. In some examples, the user interface element 602 includes the same information as a second user interface element (such as the second user interface element 702 shown and described in reference to FIG. 7), but may be presented smaller in size compared with the second user interface element.

In some examples, one or more third criteria may be utilized by the device 200 to determine whether to present a second user interface element that is different from the first user interface element 602. Satisfaction of the one or more third criteria may correspond to input indicative of continued user interest in engaging with a notification. For example, the one or more third criteria may include a criterion that is satisfied by gaze 402 in the direction (or with a threshold angle of the direction) of the first user interface element 602 for a third threshold period of time. In some examples, the one or more third criteria may be stored in a memory of the device 200. In some examples, based on a determination that the one or more third inputs satisfy the one or more third criteria, a second user interface element may be presented that is different from the first user interface element 602 (optionally also ceasing to display the first user interface element 620). In some examples, if the one or more third criteria are not satisfied, the first user interface element 602 may continue to be presented. In some examples, if the one or more third criteria are not satisfied within a threshold period of time (e.g., 1 second, 4 seconds, 10 seconds), the first user interface element 602 may be removed (e.g., the first user interface element 602 is no longer presented via the display 102).

Figure 7:
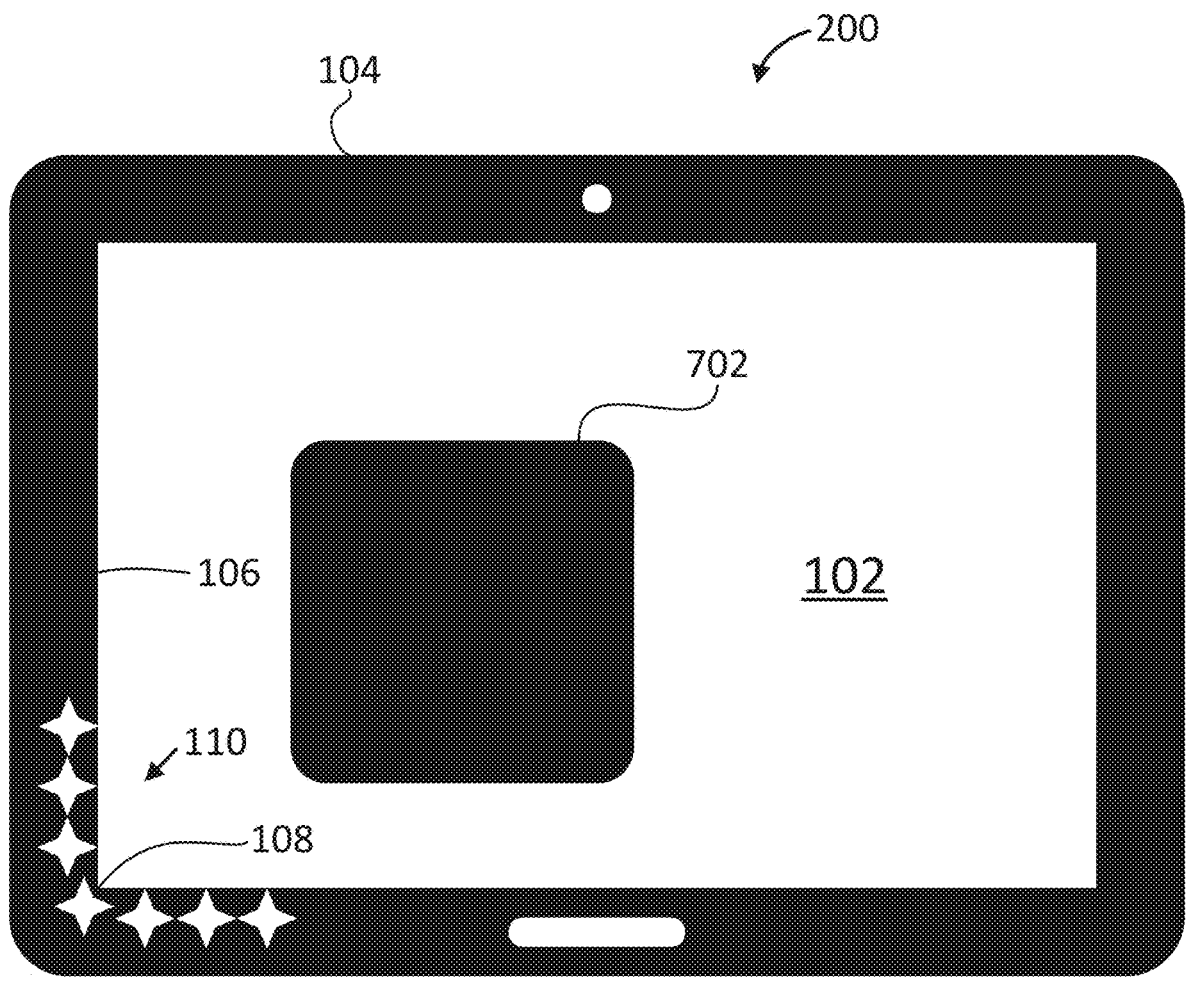
FIG. 7 illustrates the electronic device presenting a second user interface element corresponding to a notification, according to some examples of the disclosure.

FIG. 7 illustrates the device 200 presenting a second user interface element corresponding to a notification, according to some examples of the disclosure. In some examples, the second user interface element 702 may be presented after the first user interface element 602. The second user interface element 702 is optionally displayed at least partially or fully concurrently with the first user interface element 602. In some examples, the second user interface element 702 is presented after one or more inputs satisfies the third criteria. In some examples, the second user interface element 702 is different from the first user interface element 602. For example, the second user interface element 702 may present the notification in an enlarged state, while the first user interface element 602 may present the notification in a reduced state. In some examples, the second user interface element 702 may be a window that displays information corresponding to the notification. For example, if the notification triggering event is a text message, the second user interface element 702 may display the contents of the received text message to the user. In some examples, the second user interface element 702 is presented via the display 102 in an XR environment. In some examples, the second user interface element 702 may be presented in various regions of the display 102. For example, the second user interface element 702 may be presented in closer proximity to the center of the display (e.g., at the geographic center of the display or within a radius of 0.01, 0.1, 0.5, 1, 2, or 5 cm of the geographic center of the display 102) than the region where the first user interface element 602 is displayed (e.g., the second user interface element 702 is not displayed within the threshold distance from the perimeter of the display 102 at which the first user interface element 602 is displayed). In another example, the second user interface element 702 is displayed at a location in which the user was directing attention to prior to receiving the notification. For example, the user is gazing in the direction of a first location relative to an environment presented through the display 102. Then, a notification is received, and the user provides the first, second, and third inputs (e.g., gaze toward the direction of the one or more lighting devices 110 presenting the first and second indications and gaze toward the direction of the first user interface element corresponding to the notification). Once one or more third criteria are satisfied for the third input, the second user interface element 702 is displayed at the first location relative to the XR environment presented through the display (e.g., the direction of attention prior to engagement with the indications and/or user interface elements corresponding to the notification. In another example, the second user interface element 702 replaces the first user interface element at the location at which the first user interface element 602 was displayed. In another example, the second user interface element 702 is displayed within a threshold distance (e.g., 0.01, 0.1, 0.5, 1, 2 or 5 cm) of the perimeter of the display 102 and/or of the one or more lighting devices 110. In some examples, if the second user interface element 702 is displayed concurrently with the first user interface element 602, the second user interface element 702 is displayed in a separate location from the first user interface element 602. For example, if the first user interface element 602 is displayed in proximity to the lower corner 108, the second user interface element 702 may be displayed in an upper corner, or the left or right side of the display 102. In some examples, the second user interface element 702 is presented at a location that is within a threshold angle (e.g., 1 degree, 5 degrees, 15 degrees, 30 degrees, etc.) from the lower corner 108. In some examples, the second user interface element 702 is displayed at a location in a three-dimensional environment that is optionally different from the location in the three-dimensional environment that the first user interface element 602 is/was displayed. In some examples, the second user interface element 702 is displayed with a different three-dimensional spatial arrangement relative to the user's viewpoint of the environment compared to the three-dimensional spatial arrangement of the first user interface element 602 relative to the user's viewpoint of the environment. For example, the second user interface element 702 is displayed at a greater distance from the user relative to the user's viewpoint of the environment compared to the first user interface element 602 (e.g., the second user interface element 702 appears at a greater depth from the user than the first user interface element 602). In some examples, the second user interface element 702 is displayed within an orientation threshold of the first user interface element 602 (e.g., 1, 5, 15, 30, 45, 60, 75, 90 degrees).

Figure 8:
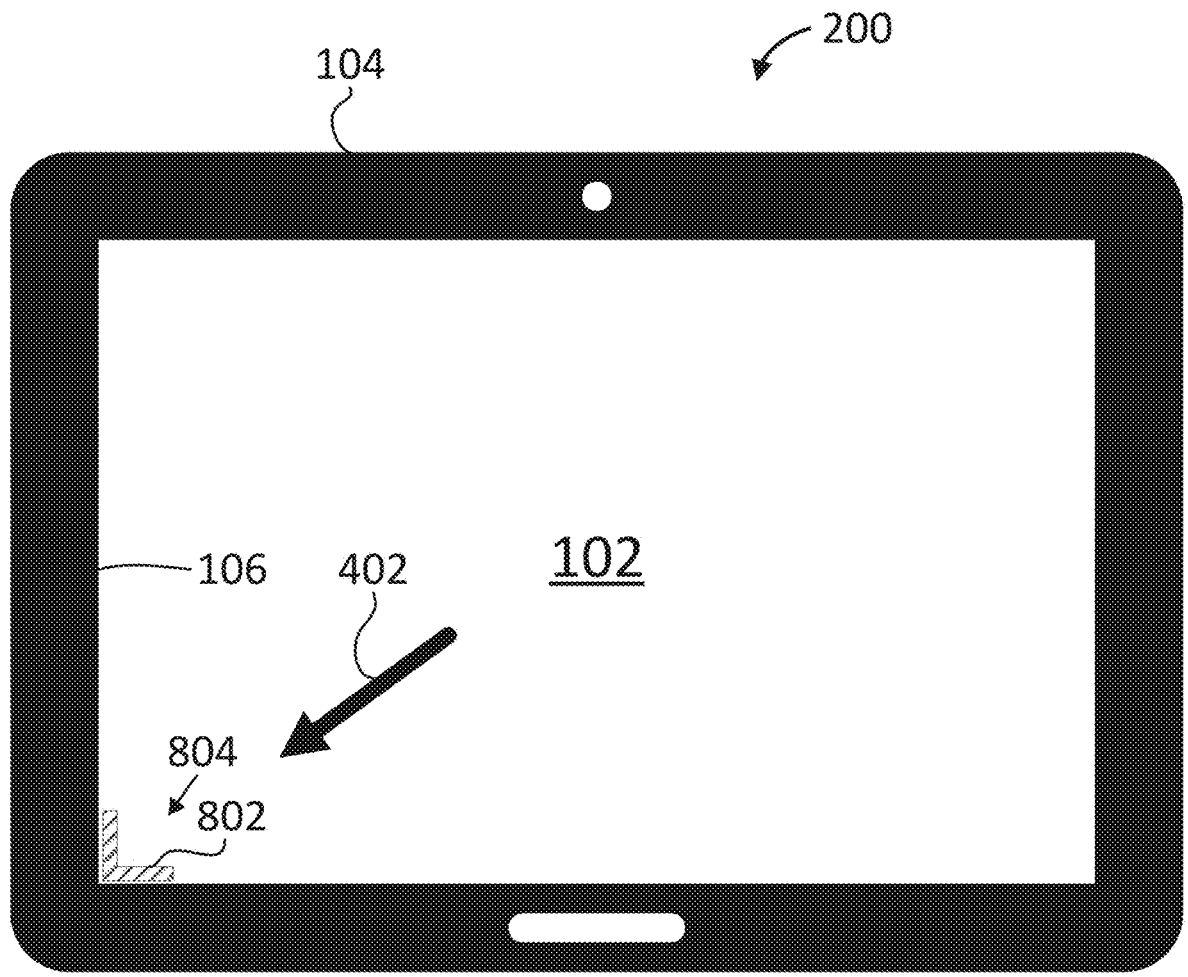
FIG. 8 illustrates the electronic device presenting a first virtual indication of a notification using a display, according to some examples of the disclosure

As described with reference to FIGS. 4-7, in some examples, indications are presented using lighting devices separate from the display and the notification user interface elements are presented using the display. In some examples, the indications and notification user interface elements are presented using the display (e.g., the device optionally does not include lighting devices 110). FIG. 8 illustrates the device 200 presenting a first virtual indication of a notification using the display 102, according to some examples of the disclosure. In some alternative examples, virtual indications of a notification may be presented via the display 102. As illustrated in FIG. 8, a first virtual indication 802 may be presented adjacent to a perimeter of the display. For example, the first virtual indication 802 may be presented in a lower corner 804 of the display 102. In some examples, the first virtual indication 802 may be presented in an XR environment (e.g., the first indication 802 is presented virtually overlaid on a physical environment). In some examples, the first virtual indication 802 may be presented using a particular characteristic. For example, the characteristic may include different patterns (e.g., flashing), brightness and/or colors. In some examples, the characteristic of the first virtual indication may depend on the type of notification the indication corresponds to. For example, the characteristic of the first virtual indication 802 may differ between receiving a phone call and receiving a text message.

In some examples, the first virtual indication 802 may transition to a second virtual indication in response to receiving, by one or more input devices of the device 200, one or more first inputs. In some examples, the one or more first inputs may be indicative of attention by a user toward the first virtual indication 802. In some examples, a second virtual indication may replace the first virtual indication 802 in response to receiving one or more first inputs. In other examples, the second virtual indication may be an expansion of the first virtual indication 802 (e.g., a continuation or expansion of the characteristic presented in the first virtual indication 802). In some examples, the one or more first inputs may be the gaze 402 directed toward the first virtual indication 802. Alternatively, the gaze 402 may be directed toward a direction that is within a threshold angle (e.g., 1 degree, 5 degrees, 15 degrees, etc.) of the lower corner 804 of the display 102. In some examples, the gaze 402 may be detected using the one or more eye tracking sensors 212 (as illustrated in FIG. 2). In other examples, alternative inputs may be received that indicate that the user is directing attention toward the first virtual indication 802, such as a verbal input by the user received by the one or more input devices.

In some examples, one or more first criteria may be utilized by the device to determine whether to update the first virtual indication 802 to the second virtual indication. Satisfaction of the one or more first criteria may correspond to input indicative of user interest in engaging with a notification. For example, the one or more first criteria may include a criterion that is satisfied when a gaze is directed in the direction of the first virtual indication 802 for a first threshold period of time (or directed within a threshold angle of the one or more lighting devices 110 or lower corner 804). In some examples, the one or more first criteria may be stored in a memory of the device 200. In some examples, if the one or more first input satisfies the one or more first criteria, a second virtual indication may be presented. In some examples, if the one or more first criteria are not satisfied, the first virtual indication 802 may continue to be presented. In some examples, if the one or more first criteria are not satisfied within a threshold period of time (e.g., 1-10 seconds) the first virtual indication 802 is removed at the conclusion of the threshold period of time (e.g., the first virtual indication 802 is no longer presented via the display 102).

Figure 9A:
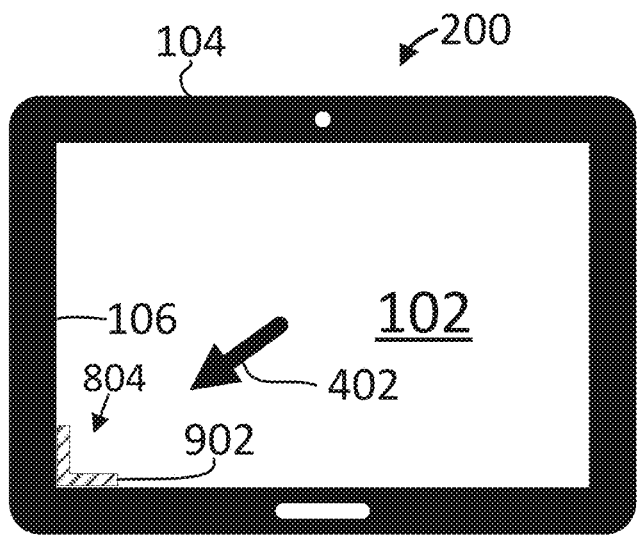
FIGS. 9A-9C illustrate the electronic device presenting a second virtual indication of a notification using the display, according to some examples of the disclosure.
Figure 9B:
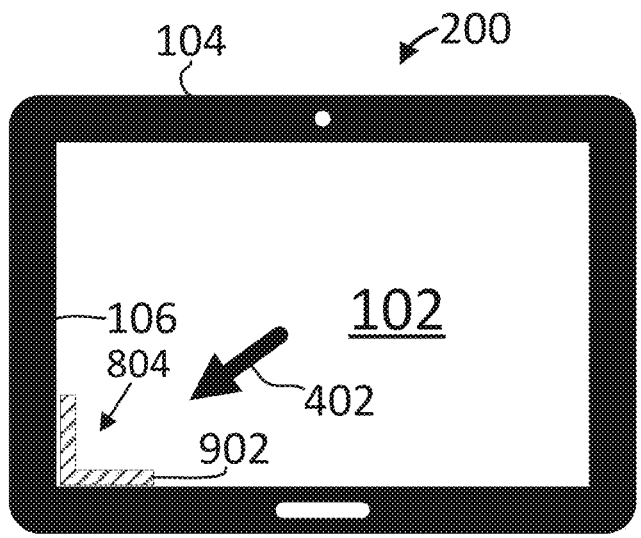
Figure 9C:
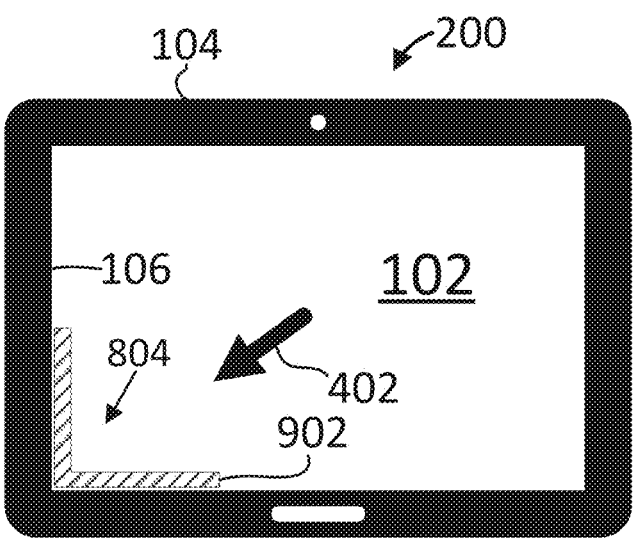

FIGS. 9A-9C illustrate the device 200 presenting a second virtual indication of a notification using the display 102, according to some examples of the disclosure. In some examples, the second virtual indication 902 may be presented after a determination that a received first input has satisfied the one or more first criteria utilized by the device to determine whether to update the first virtual indication 802 to the second virtual indication 902. Satisfaction of the one or more first criteria may correspond to input indicative of user interest in engaging with a notification. In some examples, the first virtual indication 802 may progress to the second virtual indication 902 in response to receiving the one or more first inputs. In some examples, the second virtual indication 902 may expand the characteristic of the first virtual indication 802. For example, the second virtual indication 902 may be presented as a larger virtual indication than the first virtual indication 802. For example, the first virtual indication 802 may be presented on a first region of the display 102, and the second virtual indication 902 may be presented on a second region that expands from the first region. In some examples, the second virtual indication 902 may be presented in the lower corner 804 of the display 102. In some examples, the second virtual indication 902 may include a characteristic that is different from the characteristic of the first virtual indication 802. In some examples, the second virtual indication 902 may be presented in a different pattern from the first virtual indication 802. For example, the first virtual indication 802 may include a first flashing pattern, and the second virtual indication 902 may not include a flashing pattern, or the second virtual indication 902 may include a second flashing pattern at a different frequency from the first flashing pattern. In some examples, the first virtual indication 802 may be presented with one or more first colors, and the second virtual indication 902 may be presented with one or more second colors that are different from the first color(s). In some examples, the first virtual indication 802 may be presented with a first brightness, and the second virtual indication 802 may be presented with a second brightness that is different from the first brightness. It should be understood that the first virtual indication 802 and the second virtual indication 902 may include various characteristics that differentiate the virtual presentation of the first virtual indication 802 from the second virtual indication 902.

In some examples, the device 200 may receive one or more second inputs. For example, the gaze 402 of the user toward the first virtual indication 802 may be the second input. In some examples, the second input is a continuation of the first input. For example, the first input is the gaze 402 of the user toward the first virtual indication 802, and the second input is the continuation of the gaze 402 toward the first virtual indication 802 and/or the second virtual indication 902. In some examples, the one or more first criteria (or similar modified criteria) may be utilized by the device 200 to determine whether to modify the second virtual indication 902 based on the one or more second inputs. Continued satisfaction of the one or more first criteria (or satisfaction of the similar modified criteria) may correspond to input indicative of continued user interest in engaging with a notification. FIG. 9A illustrates a first configuration of the second virtual indication 902 in which the second virtual indication 902 is presented on a region of the display 102 that expands from the region of the first virtual indication 802. FIG. 9B illustrates a second virtual configuration of the second indication 902 in which the second configuration is presented on a region of the display 102 that expands from the region of the first configuration. FIG. 9C illustrates a third configuration of the second virtual indication 902 in which the third configuration is presented on a region of the display 102 that expands from the region of the second configuration. It should be understood that further configurations of the second virtual indication 902 may be used. Modifying the second virtual indication 902 based on continued satisfaction of the one or more first criteria (or satisfaction of the similar modified criteria) provides feedback to the user that the user is completing the criteria needed to expand the notification, thereby confirming that the intent of the user is to expand the notification and improving user device interaction.

In some examples, in response to detecting a duration of the gaze 402 toward (or in the direction of) the second virtual indication 902, the second virtual indication 902 may transition configurations. For example, after a first duration (e.g., 100 ms, 500 ms, 1 second, etc.) of dwell of the gaze 402, the second virtual indication 902 may transition from the first configuration to the second configuration, and after a second duration (e.g., 200 ms, 1 second, 2 seconds) of dwell of the gaze 402, the second virtual indication 902 may transition from the second configuration to the third configuration. It should be understood that any period of time threshold (e.g., 0.1, 0.5, 1, 2, 5, 10 seconds) may be established in which the configuration of the second virtual indication 902 is modified in response to one or more received second inputs. In some examples, the transition from the first virtual indication 802 to the second virtual indication 902 is gradual and continuous, such that there is contiguous, gradual growth of the region of the display 102 that the second virtual indication 902 occupies. In some examples, the transition of the second virtual indication 902 between configurations is gradual and continuous such that there is consistent presentation of the previous configuration as the next configuration is presented in an expanded region. For example, the second virtual indication 902 is presented as a contiguous span of a particular color/pattern that gradually expands as the user dwells toward the second virtual indication 902. In some examples, the second virtual indication 902 may transition between configurations throughout the duration of the gaze 402 until one or more second criteria are satisfied.

In some examples, the device 200 may utilize one or more second criteria to determine whether to present a user interface object corresponding to the notification. Satisfaction of the one or more second criteria may correspond to input indicative of user interest in further engaging with the notification. In some examples, the one or more second criteria may include a criterion that is satisfied when the gaze 402 is directed toward the direction of the first virtual indication 802 and/or second virtual indication 902 for a second threshold period of time. Alternatively, the gaze 402 may be directed toward a direction that is within a threshold angle of the lower corner 804. In some examples, the second criteria may be stored in the memory of the device 200. In some examples, based on a determination that one or more second inputs satisfy the one or more second criteria, a user interface element (e.g., user interface element shown in FIG. 6), corresponding to a notification may be presented via the display. Further, based on a determination that the one or more second criteria are not satisfied within a threshold period of time (e.g., 1-10 seconds), the second virtual indication 902 is removed (e.g., the second virtual indication 902 ceases to be displayed).

In some examples, the transition between configurations of the second virtual indication 902 may be modified based on the one or more second inputs. For example, in a similar manner as the second virtual indication 902 transitions gradually between configurations as in accordance with continued gaze in the prescribed direction (e.g., increasing the contiguous span of the region of the display occupied by the second virtual indication 902), the second virtual indication 902 optionally transitions gradually between configurations in the opposite direction (e.g., decreasing the contiguous span of the region of the display occupied by the second virtual indication 902) in accordance with gaze departing from the prescribed direction. For example, if the second virtual indication 902 is presented as the second configuration, and the user's gaze is no longer directed toward the second virtual indication 902 (e.g., 25 ms, 50 ms, etc.) the second virtual indication 902 may transition to the first configuration. After a threshold period of time (e.g., 25 ms, 50 ms etc.) the second indication may transition to the first virtual indication 802. After a period of time subsequent to the threshold period of time, the first virtual indication 802 may be removed. In some examples, redirecting the gaze in the prescribed direction can again resume gradually expanding transitions. For example, when the second virtual indication 902 is presented as the second configuration, and the user diverts their gaze at the second virtual indication 902, the second virtual indication 902 transitions from the second configuration to the first configuration. However, if the user redirects gaze toward the second virtual indication 902 within a threshold period of time (e.g., 25 ms, 50 ms, etc.), the second virtual indication 902 may transition to the second configuration, and then to the third configuration, to eventually the maximum configuration corresponding to satisfaction of the one or more the second criteria.

In examples in which the one or more indications are displayed virtually via the display (e.g., in an XR environment), the first user interface element 602 and the second user interface element 702 may be presented via the display similarly to the examples in which the one or more indications are presented via the one or more lighting devices. As described in regard to FIG. 6, the first user interface element 602 may be presented via the display after one or more second criteria are satisfied. In some examples, the first user interface element 602 may be presented within a threshold distance to a perimeter of the display 102. For example, the first user interface element 602 may be presented adjacent to the lower corner 804 of the display 102. The first user interface element 602 may optionally be displayed concurrently with the second virtual indication 902. Similar to as described in regard to FIG. 7, the second user interface element 702 may be presented via the display after one or more third criteria are satisfied. In some examples, the second user interface element 702 may be presented in various regions of the display 102 (e.g., the lower corner 804, an upper corner, and or sides of the display that are adjacent to the perimeter 106). In some examples, the second user interface element 702 is presented in closer proximity to the geographic center of the display 102 than the region where the first user interface element 602 is presented. In some examples, the second user interface element 702 is displayed with a different three-dimensional spatial arrangement relative to the user's viewpoint of the environment compared to the three-dimensional spatial arrangement of the first user interface element 602 relative to the user's viewpoint of the environment. For example, the second user interface element 702 is displayed at a different distance from the user relative to the user's viewpoint of the environment compared to the first user interface element 602 (e.g., the second user interface element 702 appears at a different depth from the user than the first user interface element 602). In some embodiments, the second user interface element 702 is displayed within a threshold of the first user interface element 602 (e.g., 1, 5, 15, 30, 45, 60, 75, 90 degrees). In some examples, the second user interface element 702 may be displayed concurrently with the first user interface element 602.

Figure 10:
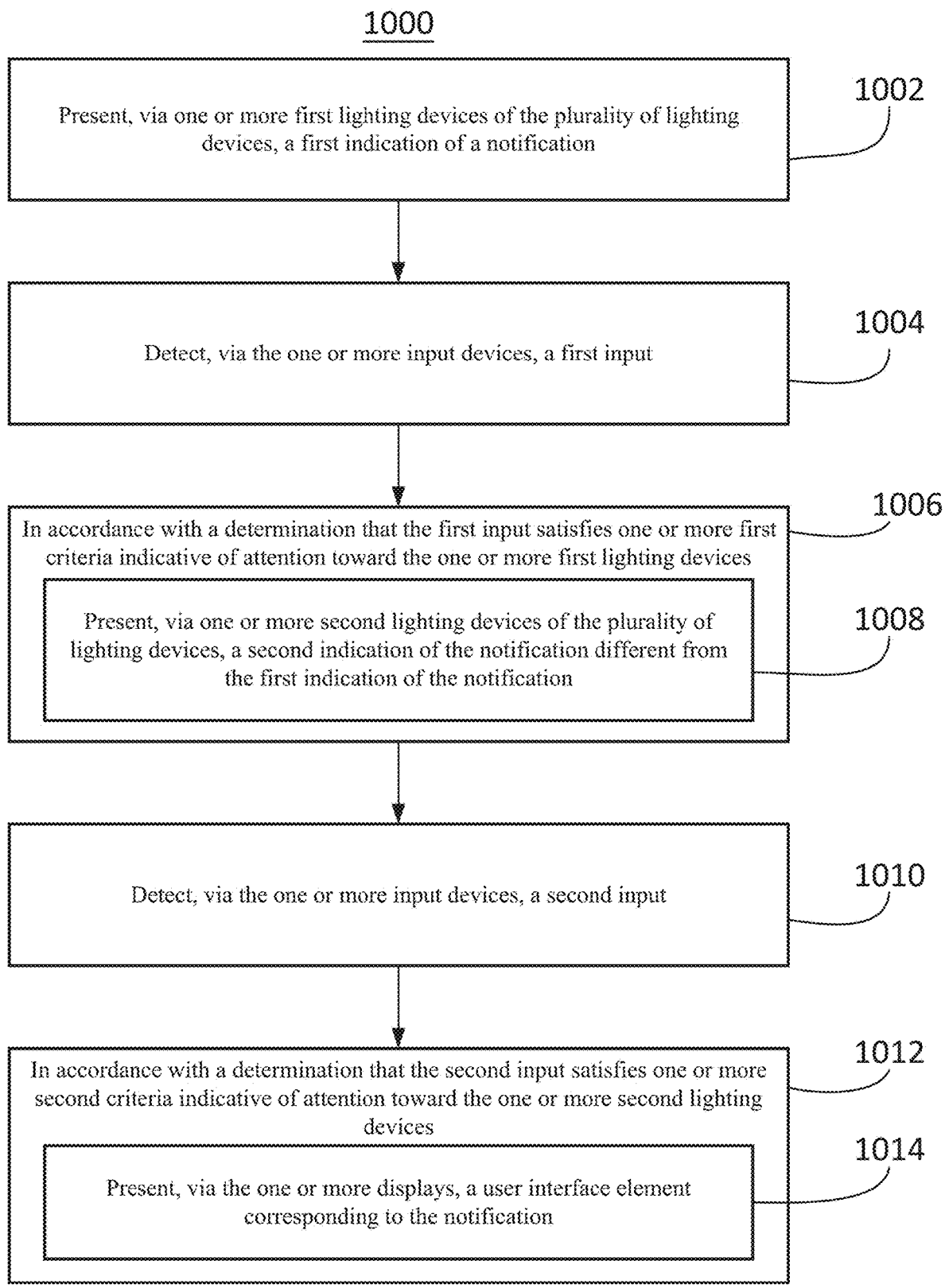
FIG. 10 illustrates an example process for presenting a notification via an electronic device, according to some examples of the disclosure.

FIG. 10 illustrates an example process for presenting a notification via an electronic device, according to some examples of the disclosure. Process 1000 may be performed at an electronic device (e.g., electronic device 200) in communication with one or more displays and one or more input devices (e.g., various sensors including one or more hand tracking sensor(s) 202, one or more location sensor(s) 204, one or more image sensor(s) 206, one or more touch sensitive surface(s) 208, one or more orientation sensor(s) 210, one or more eye tracking sensor(s) 212, and one or more microphone(s) 214 or other audio sensors, etc.). Some operations in process 1000 are optionally combined and/or optionally omitted and/or optionally changed, in some examples. In some examples, process 1000 is performed by processor 220 and memory 222.

At 1002, the electronic device presents, via one or more first lighting devices of a plurality of lighting devices, a first indication of a notification. At 1004, the electronic device detects, via the one or more input devices, a first input. In accordance with a determination at 1006 that the first input satisfies one or more first criteria (e.g., indicative of attention toward the one or more first lighting devices), at 1008, the electronic device presents, via one or more second lighting devices of the plurality of lighting devices, a second indication of the notification different from the first indication of the notification. At 1010, the electronic device detects, via the one or more input devices, a second input. In accordance with a determination at 1012 that the second input satisfies one or more second criteria (e.g., indicative of attention toward the one or more second lighting devices), at 1014 the electronic device presents, via the one or more displays, a user interface element corresponding to the notification.

Figure 11:
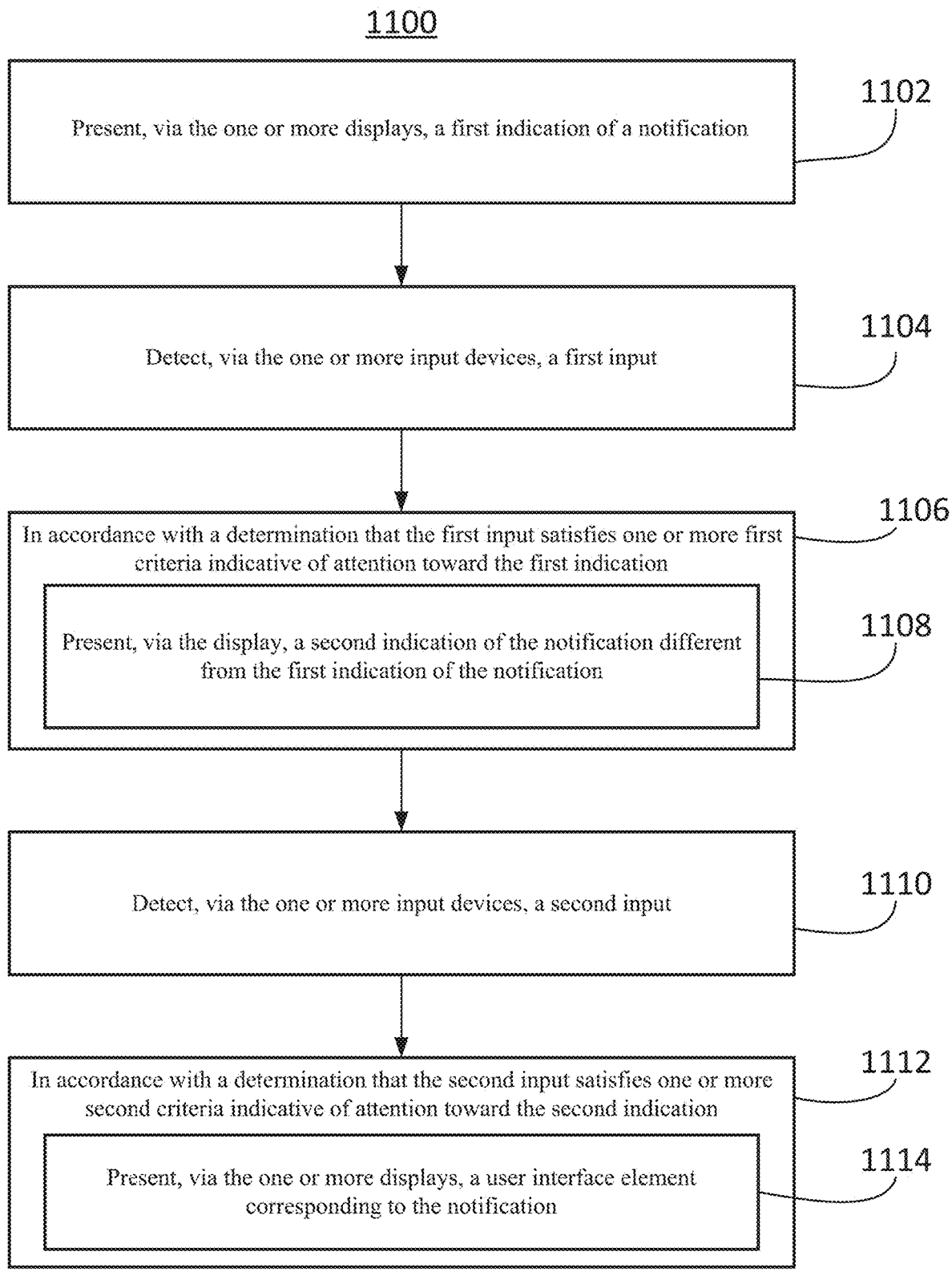
FIG. 11 illustrates an example process for presenting a notification via an electronic device, according to some examples of the disclosure.

FIG. 11 illustrates an example process for presenting a notification via an electronic device, according to some examples of the disclosure. Process 1100 may be performed at an electronic device (e.g., electronic device 200) in communication with one or more displays and one or more input devices (e.g., various sensors including one or more hand tracking sensor(s) 202, one or more location sensor(s) 204, one or more image sensor(s) 206, one or more touch sensitive surface(s) 208, one or more orientation sensor(s) 210, one or more eye tracking sensor(s) 212, and one or more microphone(s) 214 or other audio sensors, etc.). Some operations in process 1000 are optionally combined and/or optionally omitted and/or optionally changed, in some examples. In some examples, process 1000 is performed by processor 220 and memory 222.

At 1102, the electronic device presents, via the one or more displays, a first indication of a notification. At 1104, the electronic device detects, via the one or more input devices, a first input. In accordance with a determination at 1106 that the first input satisfies one or more first criteria indicative of attention toward the first indication, the electronic device presents, via the one or more displays, a second indication of the notification different from the first indication of the notification. At 1110, the electronic device detects, via the one or more input devices, a second input. In accordance with a determination at 1112 that the second input satisfies one or more second criteria indicative of attention toward the second indication, at 1114 the electronic device presents, via the one or more displays, a user interface element corresponding to the notification.

Therefore, according to the above, some examples of the disclosure are directed to a method. In some examples, the method comprises, at an electronic device in communication with a plurality of lighting devices, one or more input devices, and one or more displays: presenting via one or more lighting devices of the plurality of lighting devices, a first indication of a notification, in accordance with a determination that the first input satisfies one or more first criteria indicative of attention toward the one or more first lighting devices, presenting, via one or more second lighting devices of the plurality of lighting devices, a second indication of the notification different from the first indication, detecting, via the one or more input devices, a second input, and in accordance with a determination that the second input satisfies one or more second criteria indicative of attention toward the one or more second lighting devices, presenting, via the one or more displays, a first user interface element corresponding to the notification.

Additionally, or alternatively, in some examples, the plurality of lighting devices is arranged outside and along a perimeter of a display of the one or more displays.

Additionally, or alternatively, in some examples, the plurality of lighting devices is arranged along a corner of a display of the one or more displays.

Additionally, or alternatively, in some examples, the first input comprises a user gaze, and the one or more first criteria includes a criterion that is satisfied when the user gaze is in a direction of the plurality of lighting devices for a first threshold period of time.

Additionally, or alternatively, in some examples, in accordance with a determination that the first input does not satisfy the one or more first criteria within a second threshold period of time: ceasing to present the first indication.

Additionally, or alternatively, in some examples, the second input comprises a user gaze, and the one or more second criteria include a criterion that is satisfied when the user gaze is in a direction of the plurality of lighting devices for a third threshold period of time.

Additionally, or alternatively, in some examples, in accordance with a determination that the second input does not satisfy the one or more second criteria within a fourth threshold period of time: ceasing to present the second indication.

Additionally, or alternatively, in some examples, the method further comprises detecting, via the one or more input devices, a third input. In accordance with a determination that the third input satisfies one or more third criteria indicative of attention toward the first user interface element: presenting, via the one or more displays, a second user interface element corresponding to the notification, the second user interface element different from the first user interface element.

Additionally, or alternatively, in some examples, the first user interface element is presented within a threshold distance of a perimeter of the display.

Additionally, or alternatively, in some examples, a characteristic of the first indication corresponds to a type of the notification.

Additionally, or alternatively, in some examples, the characteristic of the first indication comprises a color, a brightness, or a pattern.

Additionally, or alternatively, in some examples, a transition from the first indication to the second indication includes changing the characteristic of the first indication.

Additionally, or alternatively, in some examples, the one or more second lighting devices include a greater quantity of lighting devices than the one or more first lighting devices, and the second indication expands the characteristic of the first indication to the one or more second lighting devices.

Additionally, or alternatively, in some examples, the plurality of lighting devices includes a light-emitting diode.

Additionally, or alternatively, in some examples, the notification is presented through a transparent or translucent display.

Additionally, or alternatively, in some examples, the electronic device is a head-mounted display.

Some examples of the disclosure are directed to an electronic device, comprising one or more processors, memory, and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Some examples of the disclosure are directed to a method. In some examples, the method comprises, at an electronic device in communication with one or more input devices and one or more displays: presenting, via the one or more displays, a first indication of a notification, detecting, via the one or more input devices, a first input, in accordance with a determination that the first input satisfies one or more first criteria indicative of attention toward the first indication, presenting, via the one or more displays, a second indication of the notification different from the first indication, detecting, via the one or more input devices, a second input, and in accordance with a determination that the second input satisfies one or more second criteria indicative of attention toward the second indication, presenting, via the one or more displays, a first user interface element corresponding to the notification.

Additionally, or alternatively, in some examples, the first indication and second indication are presented along a perimeter of a display of the one or more displays.

Additionally, or alternatively, in some examples, the first indication and the second indication are presented along a corner of a display of the one or more displays.

Additionally, or alternatively, in some examples, the first input comprises a user gaze, and the one or more first criteria includes a criterion that is satisfied when the user gaze is in a direction of the first indication for a first threshold period of time.

Additionally, or alternatively, in some examples, in accordance with a determination that the first input does not satisfy the one or more first criteria within a second threshold period of time: ceasing to present the first indication.

Additionally, or alternatively, in some examples, the second input comprises a user gaze, and the one or more second criteria include a criterion that is satisfied when the user gaze is in a direction of the second indication for a third threshold period of time.

Additionally, or alternatively, in some examples, in accordance with a determination that the second input does not satisfy the one or more second criteria within a fourth threshold period of time: ceasing to present the second indication.

Additionally, or alternatively, in some examples, the method further comprises detecting, via the one or more input devices, a third input. In accordance with a determination that the third input satisfies one or more third criteria indicative of attention toward the first user interface element: presenting, via the one or more displays, a second user interface element corresponding to the notification, the second user interface element different from the first user interface element.

Additionally, or alternatively, in some examples, the first user interface element is presented within a threshold distance of a perimeter of the display.

Additionally, or alternatively, in some examples, a characteristic of the first indication corresponds to a type of the notification.

Additionally, or alternatively, in some examples, the characteristic of the first indication comprises a color, brightness or pattern.

Additionally, or alternatively, in some examples, a transition from the first indication to the second indication includes changing the characteristic of the first indication.

Additionally, or alternatively, in some examples, the notification is presented through a transparent or translucent display.

Additionally, or alternatively, in some examples, the electronic device is a head-mounted display.

Some examples of the disclosure are directed to an electronic device, comprising one or more processors, memory, and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method, comprising:
at an electronic device in communication with a plurality of lighting devices, one or more input devices and one or more displays:
presenting, via one or more first lighting devices of the plurality of lighting devices, a first indication of a notification;
detecting, via the one or more input devices, a first input;
in accordance with a determination that the first input satisfies one or more first criteria indicative of attention toward the one or more first lighting devices, presenting, via one or more second lighting devices of the plurality of lighting devices, a second indication of the notification different from the first indication;
detecting, via the one or more input devices, a second input; and
in accordance with a determination that the second input satisfies one or more second criteria indicative of attention toward the one or more second lighting devices, presenting, via the display, a first user interface element corresponding to the notification.

2. The method of claim 1, wherein the plurality of lighting devices is arranged outside and along a perimeter or a perimeter of a display of the one or more displays.

3. The method of claim 1, wherein the first input comprises a user gaze, and the one or more first criteria includes a criterion that is satisfied when the user gaze is in a direction of the plurality of lighting devices for a threshold period of time.

4. The method of claim 1, further comprising:
in accordance with a determination that the first input does not satisfy the one or more first criteria within a threshold period of time, ceasing to present the first indication.

5. The method of claim 1, wherein the second input comprises a user gaze and the one or more second criteria include a criterion that is satisfied when the user gaze is in a direction of the plurality of lighting devices for a threshold period of time.

6. The method of claim 1, further comprising:
in accordance with a determination that the second input does not satisfy the one or more second criteria within a threshold period of time, ceasing to present the second indication.

7. The method of claim 1, further comprising:
detecting, via the one or more input devices, a third input; and
in accordance with a determination that the third input satisfies one or more third criteria indicative of attention toward the first user interface element, presenting, via the one or more displays, a second user interface element corresponding to the notification, wherein the second user interface element is different from the first user interface element.

8. The method of claim 1, wherein the one or more second lighting devices include a greater quantity of lighting devices than the one or more first lighting devices, and the second indication expands a characteristic of the first indication to the one or more second lighting devices.

9. An electronic device, comprising:
one or more processors;
memory; and
one or more programs, wherein the one or more programs are stored in the memory and configured to be executed by the one or more processors, the one or more programs including instructions for performing a method comprising:
presenting, via one or more first lighting devices of a plurality of lighting devices, a first indication of a notification;
detecting, via one or more input devices, a first input;
in accordance with a determination that the first input satisfies one or more first criteria indicative of attention toward the one or more first lighting devices, presenting, via one or more second lighting devices of the plurality of lighting devices, a second indication of the notification different from the first indication;
detecting, via the one or more input devices, a second input; and
in accordance with a determination that the second input satisfies one or more second criteria indicative of attention toward the one or more second lighting devices, presenting, via one or more displays, a first user interface element corresponding to the notification.

10. The electronic device of claim 9, wherein the plurality of lighting devices is arranged outside and along a perimeter of a display of the one or more displays.

11. The electronic device of claim 10, wherein the plurality of lighting devices is arranged along a corner of the display.

12. The electronic device of claim 9, wherein the first input comprises a user gaze, and wherein the one or more first criteria includes a criterion that is satisfied when the user gaze is in a direction of the plurality of lighting devices for a first threshold period of time.

13. The electronic device of claim 9, further comprising:
in accordance with a determination that the first input does not satisfy the one or more first criteria within a second threshold period of time, ceasing to present the first indication.

14. The electronic device of claim 9, wherein the second input comprises a user gaze, and wherein the one or more second criteria include a criterion that is satisfied when the user gaze is in a direction of the plurality of lighting devices for a threshold period of time.

15. The electronic device of claim 9, further comprising:
in accordance with a determination that the second input does not satisfy the one or more second criteria within a threshold period of time, ceasing to present the second indication.

16. The electronic device of claim 9, further comprising:
detecting, via the one or more input devices, a third input; and
in accordance with a determination that the third input satisfies one or more third criteria indicative of attention toward the first user interface element, presenting, via the one or more displays, a second user interface element corresponding to the notification, wherein the second user interface element is different from the first user interface element.

17. A non-transitory computer readable storage medium storing one or more programs, the one or more programs comprising instructions, which when executed by one or more processors of an electronic device, cause the electronic device to perform a method comprising:
presenting, via one or more first lighting devices of a plurality of lighting devices, a first indication of a notification;
detecting, via one or more input devices, a first input;
in accordance with a determination that the first input satisfies one or more first criteria indicative of attention toward the one or more first lighting devices, presenting, via one or more second lighting devices of the plurality of lighting devices, a second indication of the notification different from the first indication;
detecting, via the one or more input devices, a second input; and
in accordance with a determination that the second input satisfies one or more second criteria indicative of attention toward the one or more second lighting devices, presenting, via one or more displays, a first user interface element corresponding to the notification.

18. The non-transitory computer readable storage medium of claim 17, wherein the plurality of lighting devices is arranged outside and along a perimeter of a display of the one or more displays.

19. The non-transitory computer readable storage medium of claim 18, wherein the plurality of lighting devices is arranged along a corner of the display.

20. The non-transitory computer readable storage medium of claim 17, wherein the first input comprises a user gaze, and the one or more first criteria includes a criterion that is satisfied when the user gaze is in a direction of the plurality of lighting devices for a threshold period of time.

21. The non-transitory computer readable storage medium of claim 17, further comprising:
- in accordance with a determination that the first input does not satisfy the one or more first criteria within a threshold period of time, ceasing to present the first indication.

22. The non-transitory computer readable storage medium of claim 17, wherein the second input comprises a user gaze, and wherein the one or more second criteria include a criterion that is satisfied when the user gaze is in a direction of the plurality of lighting devices for a threshold period of time.

23. The non-transitory computer readable storage medium of claim 17, further comprising:
- in accordance with a determination that the second input does not satisfy the one or more second criteria within a threshold period of time, ceasing to present the second indication.

24. The non-transitory computer readable storage medium of claim 17, further comprising:
- detecting, via the one or more input devices, a third input; and
- in accordance with a determination that the third input satisfies one or more third criteria indicative of attention toward the first user interface element, presenting, via the one or more displays, a second user interface element corresponding to the notification, wherein the second user interface element is different from the first user interface element.

\* \* \* \* \*